United States Patent
Wijaya et al.

(10) Patent No.: US 7,832,221 B2
(45) Date of Patent: Nov. 16, 2010

(54) VEHICLE COMPRESSOR CONTROL SYSTEM AND METHOD

(75) Inventors: Halim Wijaya, Canton, MI (US); Gary Dage, Franklin, MI (US); Wayne Buescher, Canton, MI (US); Christopher Greiner, Birmingham, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 994 days.

(21) Appl. No.: 11/551,338

(22) Filed: Oct. 20, 2006

(65) Prior Publication Data

US 2008/0093132 A1 Apr. 24, 2008

(51) Int. Cl.
*B60H 1/32* (2006.01)
*F25B 49/00* (2006.01)

(52) U.S. Cl. .................. 62/133; 62/209; 62/228.4
(58) Field of Classification Search ............ 62/133, 62/165, 271, 228.4, 208, 209
See application file for complete search history.

(56) References Cited

U.S. PATENT DOCUMENTS

| | | | |
|---|---|---|---|
| 4,823,392 A * | 4/1989 | Walker .................. 381/106 |
| 5,023,531 A | 6/1991 | Altemose et al. |
| 5,361,593 A * | 11/1994 | Dauvergne .................. 62/89 |
| 5,924,296 A * | 7/1999 | Takano et al. .............. 62/133 |
| 6,360,958 B1 * | 3/2002 | Ito et al. .................. 237/2 A |
| 6,745,585 B2 | 6/2004 | Kelm et al. |
| 6,889,762 B2 * | 5/2005 | Zeigler et al. ............. 165/240 |
| 6,931,873 B2 | 8/2005 | Oomura et al. |
| 6,955,060 B2 | 10/2005 | Homan et al. |
| 7,032,393 B2 | 4/2006 | Tamai et al. |

* cited by examiner

*Primary Examiner*—Marc E Norman
(74) *Attorney, Agent, or Firm*—David B. Kelley; Brooks Kushman P.C.

(57) ABSTRACT

A vehicle compressor is controlled based on an environment parameter and a vehicle status parameter. In at least one embodiment, a temperature control system for a vehicle including an engine is provided. The system includes a compressor having a target operating speed. The system also includes an environment sensor arrangement configured to sense an environment parameter and a vehicle status sensor arrangement configured to sense a vehicle status parameter. The system further includes a control module that determines a maximum operating speed of the compressor as a function of both the environment parameter and the vehicle status parameter. The control module limits an operating speed of the compressor to the maximum operating speed if the target operating speed is greater than the maximum operating speed.

18 Claims, 6 Drawing Sheets

Engine Off

Vehicle Speed > (30) mph

| T cabin (° F) | Compressor RPM |
|---|---|
| <80 | 9,000 |
| ≥80 | 9,500 |

(5) mph ≤ Vehicle Speed ≤ (30) mph

| T cabin (° F) | Compressor RPM |
|---|---|
| <80 | 8,500 |
| ≥80 | 9,500 |

Vehicle Speed < (5) mph

| T cabin (° F) | Compressor RPM |
|---|---|
| <80 | 8,000 |
| ≥80 | 9,500 |

Engine On

Vehicle Speed > (30) mph

| T cabin (° F) | Compressor RPM |
|---|---|
| <80 | 9,500 |
| ≥80 | 10,000 |

(5) mph ≤ Vehicle Speed ≤ (30) mph

| T cabin (° F) | Compressor RPM |
|---|---|
| <80 | 9,000 |
| ≥80 | 10,000 |

Vehicle Speed < (5) mph

| T cabin (° F) | Compressor RPM |
|---|---|
| <80 | 8,500 |
| ≥80 | 10,000 |

Fig. 2

VEHICLE COMPRESSOR CONTROL SYSTEM AND METHOD

BACKGROUND OF THE INVENTION

1. Field of the Invention

The invention relates to vehicle compressor control systems and methods.

2. Background Discussion

Air conditioning systems for alternatively powered vehicles, such as hybrid electric vehicles, may include an electric compressor. Noise, vibration, and harshness (NVH) may be associated with an electric compressor at certain operating speeds. For example, as compressor speed increases, NVH increases.

A vehicle's status, e.g., speed, and its environment, e.g., cabin temperature, may influence a driver's perception of NVH associated with the speed of a compressor. A driver may be less sensitive to such NVH as noise generated from the operation of the vehicle increases. For example, noise accompanying an increase in vehicle speed may mask noise from the compressor. A driver may also be less sensitive to NVH as cabin temperature increases. The driver may be willing to tolerate NVH in order to allow the compressor to cool the vehicle's cabin more quickly.

A system and method are desired for controlling a vehicle compressor based on a vehicle's status and its environment.

SUMMARY OF THE INVENTION

In at least one embodiment, the invention takes the form of a temperature control system for a vehicle including an engine. The system includes a compressor having a target operating speed. The system also includes an environment sensor arrangement configured to sense an environment parameter and a vehicle status sensor arrangement configured to sense a vehicle status parameter. The system further includes a control module in communication with the compressor. The control module determines a maximum operating speed of the compressor as a function of both the environment parameter and the vehicle status parameter. The control module limits an operating speed of the compressor to the maximum operating speed if the target operating speed is greater than the maximum operating speed.

In at least one embodiment, the invention takes the form of a method for controlling a vehicle compressor having a target operating speed. The method includes receiving a signal indicative of an environment parameter and receiving a signal indicative of a vehicle status parameter. The method also includes at least one of increasing and decreasing the target operating speed based on one of the environment parameter and the vehicle status parameter to determine a modified operating speed. The method further includes at least one of increasing and decreasing the modified operating speed based on the other of the environment parameter and the vehicle status parameter to determine an optimum operating speed. The method still further includes operating the compressor at the optimum operating speed.

In at least one embodiment, the invention takes the form of a method for controlling a vehicle compressor having a target operating speed. The method includes receiving a signal indicative of an environment parameter and receiving a signal indicative of a vehicle status parameter. The method also includes determining a maximum operating speed of the compressor as a function of both the environment parameter and the vehicle status parameter. The method further includes limiting an operating speed of the compressor to the maximum operating speed if the target operating speed is greater than the maximum operating speed.

BRIEF DESCRIPTION OF THE DRAWINGS

FIG. 2 shows compressor speed data used in practicing an embodiment of the invention.

DETAILED DESCRIPTION OF EMBODIMENTS OF THE INVENTION

Figure 1:
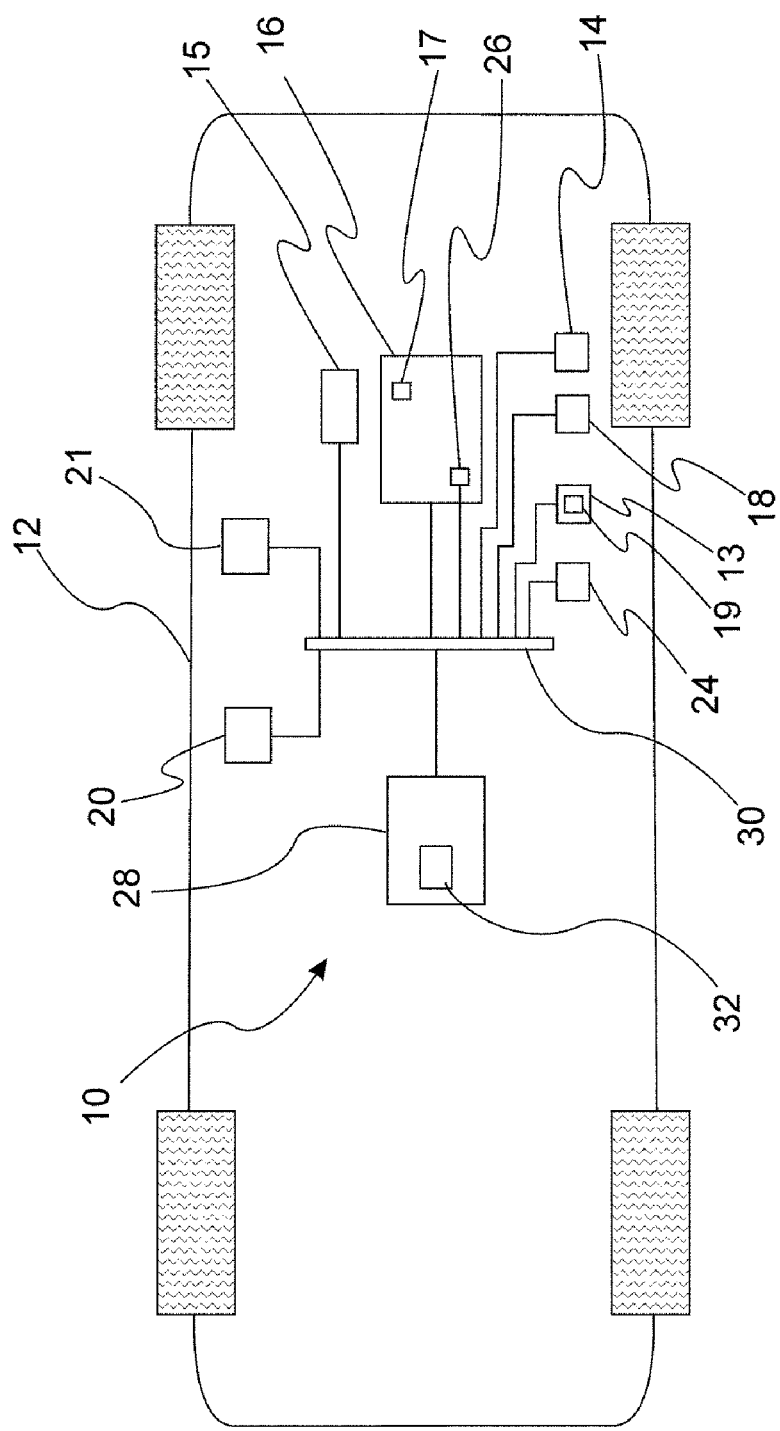
FIG. 1 shows a system for controlling a compressor in accordance with an embodiment of the invention.

FIG. 1 shows temperature control system 10 for vehicle 12. Vehicle 12 includes evaporator 13, climate control module 14, radio 15, engine 16, and evaporator sensor 19 for sensing evaporator temperature. Engine 16 includes cooling fan 17.

System 10 includes electric compressor 18. System 10 also includes environment sensors, e.g., cabin temperature sensor 20 for sensing cabin temperature and ambient temperature sensor 21 for sensing ambient temperature, and vehicle status sensors, e.g., vehicle speed sensor 24 for sensing vehicle speed and engine RPM sensor 26 for sensing whether engine 16 is on or off. System 10 further includes control module 28, e.g., powertrain control module. Control module 28 may comprise one or more control modules located throughout vehicle 12.

Climate control module 14, control module 28, and sensors 19, 20, 21, 24, and 26 may communicate via data bus 30. Data travels over data bus 30 using a Controller Area Network (CAN) protocol. They may alternatively communicate in any other suitable fashion, e.g., hardwire, wireless.

Control module 28 and radio 15 may communicate regarding a volume of radio 15 via data bus 30 using the CAN protocol. For example, radio 15 may periodically broadcast a message indicative of its volume over data bus 30. Alternatively, control module 28 may request radio 15 to broadcast a message indicative of its volume over data bus 30.

A target operating speed for compressor 18 may be determined in any suitable fashion. For example, climate control module 14 determines a target evaporator temperature via a look-up table based on a requested temperature, an actual evaporator temperature, and an ambient temperature. Fewer or other parameters may also be used, e.g., humidity, sun load. Climate control module 14 then broadcasts the target evaporator temperature to control module 28 via data bus 30. Control module 28 determines a target operating speed for compressor 18 via a look-up table stored within memory 32 based on the target evaporator temperature, the actual evaporator temperature, and the ambient temperature. Fewer or other parameters may also be used, e.g., cabin temperature. Alternatively, climate control module 14 may determine a target operating speed for compressor 18 as described above and broadcast the target operating speed to control module 28 via data bus 30.

Control module 28 receives information regarding environment parameters, such as cabin temperature, and status parameters, such as vehicle speed, from sensors 20, 21, 24, and 26.

Control module 28 controls cooling fan 17 by broadcasting, over data bus 30, commands dictating the speed of cooling fan 17. As such, control module 28 is informed of the speed of cooling fan 17.

Control module 28 determines a maximum operating speed of compressor 18 via a look-up table residing in memory 32 based on the environment parameter(s) and status parameter(s), i.e., the maximum operating speed is a function of both the environment parameter(s) and the status parameter(s). FIG. 2 is an example look-up table residing in memory 32. Control module 28 may, alternatively, determine the maximum operating speed of compressor 18 in any other suitable fashion. For example, if-then logic may be implemented. If the engine is "off" and the vehicle speed is less than 5 miles per hour (mph) and the cabin temperature is less than 80 degrees F., then the maximum compressor speed is 8,000 revolutions per minute (rpm.)

Climate control module 14 may instead determine the maximum operating speed of compressor 18 as described above and broadcast the maximum operating speed to control module 28 via data bus 30.

In the example of FIG. 2, cabin temperature is the environment parameter and engine on/off state and vehicle speed are the status parameters. Any number of other environment parameters and status parameters, however, may be used to determine the maximum operating speed.

FIG. 2 specifies various ranges for certain parameters. The ranges and maximum speeds may be different depending on the application. The ranges and maximum speeds may be determined through vehicle testing or any other suitable means, such as computer modeling.

Generally as vehicle speed increases, the maximum operating speed of compressor 18 may increase. A driver may be less aware of NVH associated with the speed of compressor 18 as noise generated from the operation of vehicle 12 increases. Similarly, as the cabin temperature increases, the maximum operating speed of compressor 18 may increase. A driver may be willing to tolerate NVH in order to allow the cabin temperature to more quickly achieve a desired temperature. Because the maximum operating speed depends on both the environment parameter(s) and the status parameter(s), system 10 may adjust the speed of compressor 18 to account for a driver's willingness to tolerate or perceive NVH associated with the speed of compressor 18.

Figure 3A:
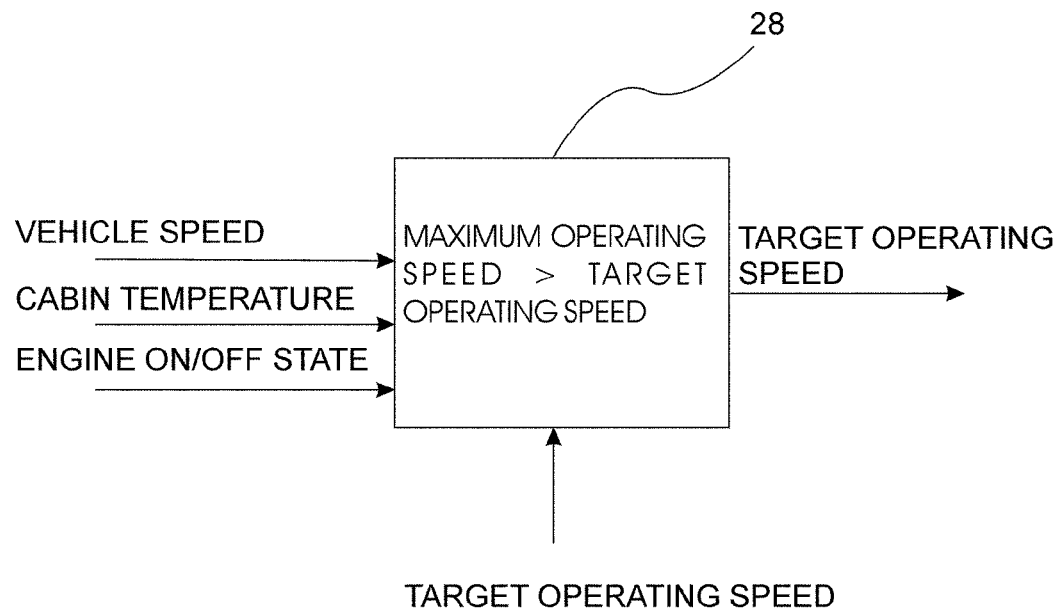
FIGS. 3a-3b show a control module in accordance with an embodiment of the invention.
Figure 3B:
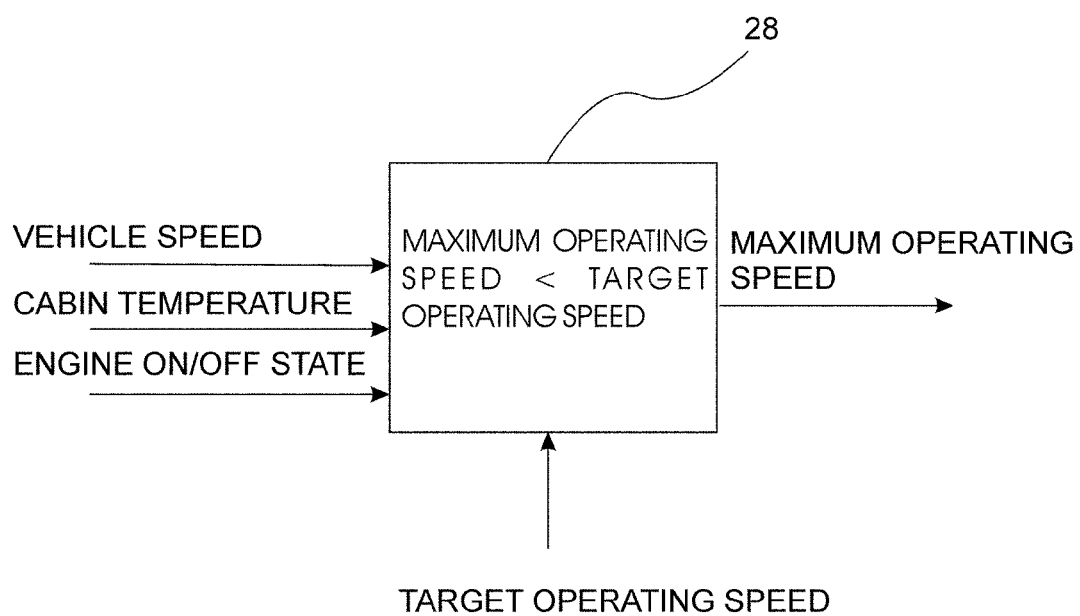

Control module 28 compares the target operating speed with the maximum operating speed. If the target is less than the maximum, control module 28 commands compressor 18 to run at the target speed as shown in FIG. 3_a_. If the target exceeds the maximum, control module 28 commands compressor 18 to run at the maximum speed as shown in FIG. 3_b_.

Figure 4:
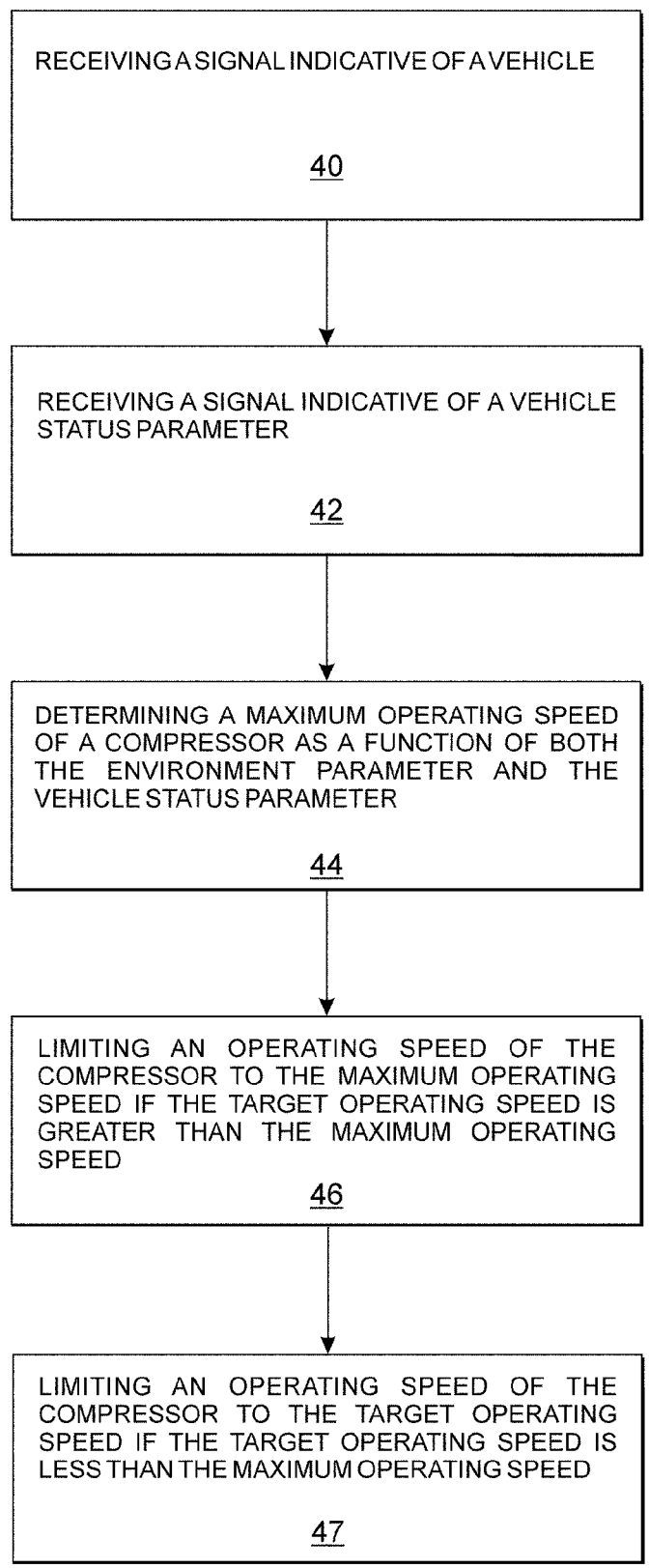
FIG. 4 shows a method for controlling a compressor in accordance with an embodiment of the invention.

FIG. 4 shows a strategy for controlling a compressor. At step 40, a signal indicative of a vehicle environment parameter is received. At step 42, a signal indicative of a vehicle status parameter is received. At step 44, a maximum operating speed of a compressor as a function of both the environment parameter and the vehicle status parameter is determined. At step 46, an operating speed of the compressor is limited to the maximum operating speed if the target operating speed is greater than the maximum operating speed. At step 47, an operating speed of the compressor is limited to the target operating speed if the target operating speed is less than the maximum operating speed.

Figure 5:
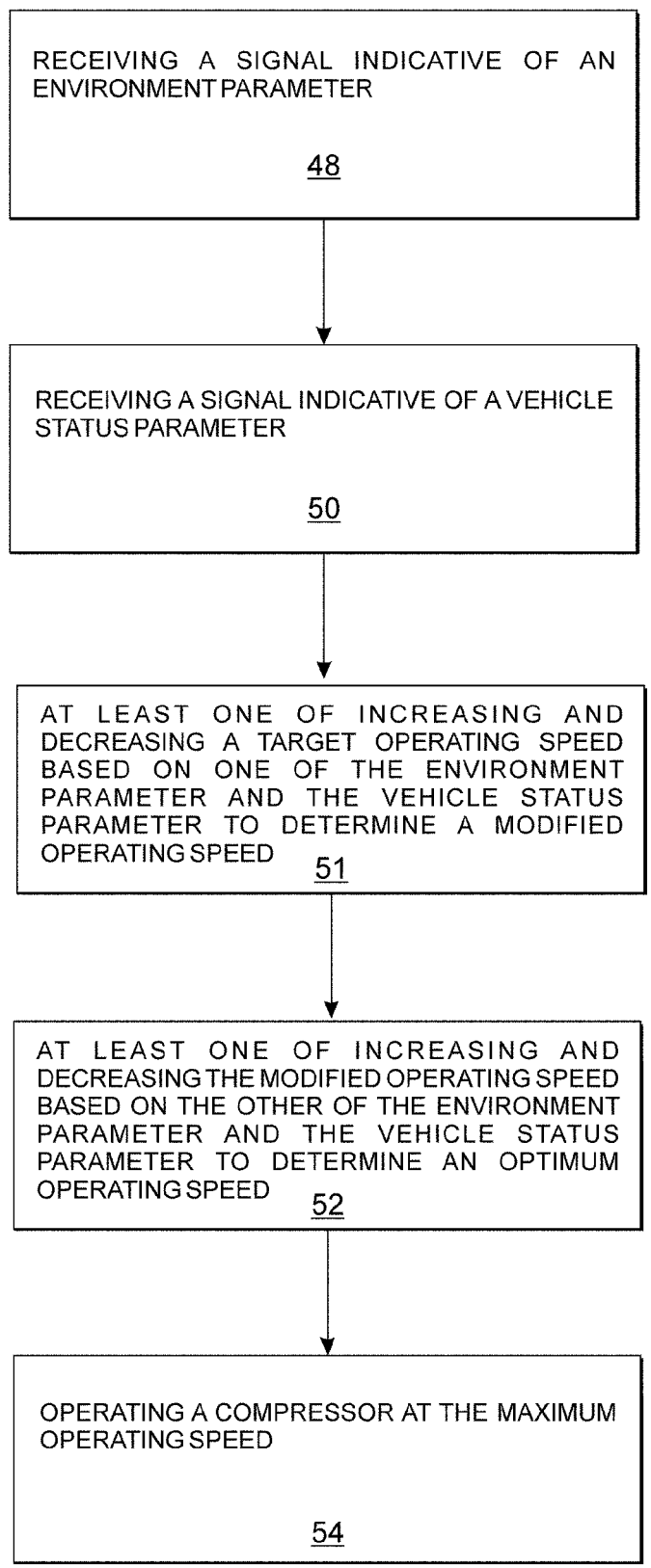
FIG. 5 shows a method for controlling a compressor in accordance with an embodiment of the invention.

FIG. 5 shows a method for controlling a compressor. At step 48, a signal indicative of an environment parameter is received. At step 50, a signal indicative of a vehicle status parameter is received. At step 51, a target operating speed is increased or decreased based on one of the environment parameter and the vehicle status parameter to determine a modified operating speed. At step 52, the modified operating speed is increased or decreased based on the other of the environment parameter and the vehicle status parameter to determine an optimum operating speed. At step 54, the compressor is operated at the optimum operating speed.

Figure 6:
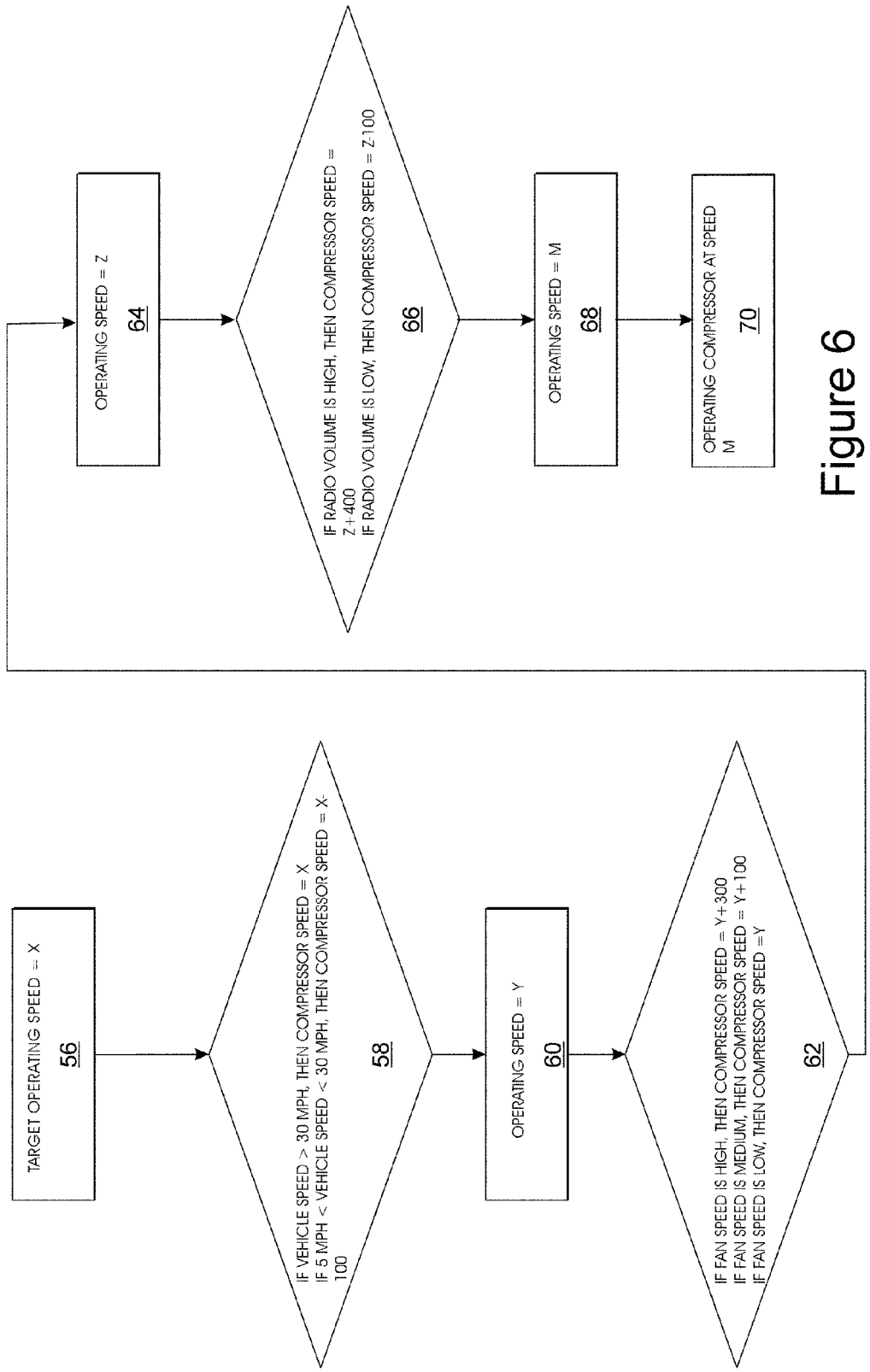
FIG. 6 shows a method for controlling a compressor in accordance with an embodiment of the invention.

FIG. 6 shows a method for determining an optimum operating speed of compressor 18 based on environment parameter(s) and vehicle status parameter(s).

At step 56, control module 28 determines the target operating speed of compressor 18, e.g., "X" rpm.

At step 58, the target operating speed may be altered by a predetermined amount to account for vehicle speed. For example, if vehicle speed is greater than 30 mph, then the target operating speed is not altered. If the vehicle speed is greater than 5 mph and less than 30 mph, the target operating speed is decreased by a predetermined amount, e.g., 100 rpm. If the vehicle speed is less than 5 mph, the target operating speed is decreased by a predetermined amount, e.g., 200 rpm.

At step 60, an operating speed is determined from the outcome of step 58, e.g., "Y" rpm.

At step 62, the operating speed of step 60 may be altered by a predetermined amount to account for cooling fan speed. For example, if cooling fan speed is high, e.g., 7000-1000 rpm, then the operating speed is increased by 300 rpm. If cooling fan speed is medium, e.g., 3000-6999 rpm, then the operating speed is increased by 100 rpm. If cooling fan speed is low, e.g., 0-2999 rpm, then the operating speed is not altered.

At step 64, an operating speed is determined from the outcome of step 62, e.g., "Z" rpm.

At step 66, the operating speed of step 64 may be altered by a predetermined amount to account for radio volume. For example, if radio volume is high, then the operating speed is increased by 400 rpm. If radio volume is low, then the operating speed is decreased by 100 rpm.

At step 68, the optimum operating speed is determined from the outcome of step 66.

At step 70, compressor 18 is operated at the optimum operating speed.

The method of FIG. 6 may also include a step whereby the optimum operating speed cannot exceed a maximum operating speed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle comprising:
  an engine;
  a compressor having a target speed;
  a sensor for sensing an environment parameter;
  another sensor for sensing an on/off state of the engine; and
  a control module configured to (i) determine a maximum speed of the compressor based on the environment parameter and the on/off state and (ii) limit a speed of the compressor to the maximum speed if the target speed is greater than the maximum speed.

2. The vehicle of claim 1 wherein the environment parameter comprises an ambient temperature.

3. The vehicle of claim 1 wherein the environment parameter comprises a vehicle cabin temperature.

4. The vehicle of claim 1 further comprising a radio and wherein the environment parameter comprises a volume of the radio.

5. The vehicle of claim 1 wherein the control module is configured to determine the maximum speed of the compressor further based on vehicle speed.

6. The vehicle of claim 1 further comprising a cooling fan and wherein the control module is configured to determine the maximum speed of the compressor further based on a speed of the cooling fan.

7. The vehicle of claim 1 wherein the control module comprises a powertrain control module.

8. The vehicle of claim 1 wherein the control module is further configured to limit the speed of the compressor to the target speed if the target speed is less than the maximum speed.

9. A method for controlling a vehicle compressor having a target operating speed, the method comprising:
   receiving a signal indicative of an environment parameter;
   receiving a signal indicative of a vehicle status parameter, wherein the vehicle status parameter comprises a speed of an engine cooling fan;
   at least one of increasing and decreasing the target operating speed based on one of the environment parameter and the vehicle status parameter to determine a modified operating speed;
   at least one of increasing and decreasing the modified operating speed based on the other of the environment parameter and the vehicle status parameter to determine an optimum operating speed; and
   operating the compressor at the optimum operating speed.

10. The method of claim 9 wherein the environment parameter comprises at least one of an ambient temperature and a vehicle cabin temperature.

11. The method of claim 9 wherein the environment parameter comprises a volume of a radio.

12. The method of claim 9 wherein the vehicle status parameter comprises an on/off state of an engine.

13. The method of claim 9 wherein the optimum operating speed is limited to a maximum operating speed.

14. The method of claim 9 wherein the target operating speed is at least one of increased and decreased by a predetermined amount.

15. The method of claim 9 wherein the modified operating speed is at least one of increased and decreased by a predetermined amount.

16. A method for controlling a vehicle compressor having a target speed comprising:
   receiving an environment parameter;
   receiving a vehicle status parameter, wherein the vehicle status parameter comprises an on/off state of an engine;
   determining a maximum speed of the compressor based on the environment and vehicle status parameters; and
   limiting a speed of the compressor to the maximum speed if the target speed is greater than the maximum speed.

17. The method of claim 16 further comprising limiting a speed of the compressor to the target speed if the target speed is less than the maximum speed.

18. The method of claim 16 wherein the environment parameter comprises a cabin temperature.

* * * * *